United States Patent Office 3,515,628
Patented June 2, 1970

3,515,628
POLYESTER RESIN MELT ADHESIVE LAMINATE
AND METHOD OF MAKING SAME
Winston J. Jackson, Jr., and John R. Caldwell, Kingsport, Tenn., assignors to Eastman Kodak Company, Rochester, N.Y., a corporation of New Jersey
No Drawing. Filed May 4, 1966, Ser. No. 547,441
Int. Cl. B32b 27/36, 27/38; C09j 5/00
U.S. Cl. 161—184       8 Claims

ABSTRACT OF THE DISCLOSURE

Hot melt adhesives of linear, aliphatic, thermoplastic, saturated and heat resistant polyesters derived from at least one dicarboxylic acid and at least one glycol, having a $T_g$ below about 30° C. and a crystallinity of greater than about 5% and less than about 25% provide improved adhesives for bonding together a wide variety of substrates. Exemplary are the polyesters of 1,4-butanediol and terephthalic, isophthalic, hexahydroterephthalic, or hexahydroisophthalic acid.

---

This invention generally concerns polyester compositions having special properties, and particularly concerns their unique use for bonding a variety of difficulty bondable structural members and substrates.

Heretofore, polyester compositions, particularly those which have no residual unsaturation and hence none of the cross-linking type of curability, have generally provided unacceptable adhesive bonds between metals such as aluminum or steel, or between various coatings of cured epoxy or other resinous materials on supporting structures. Particularly troublesome is the problem of obtaining and retaining proper bonding where the structure is subjected to considerable stress and strain throughout a range of temperatures such as from about 0° C. to room temperature or higher.

An illustration of such conditions is found in the use of liquid containers such as beverage cans which may be alternately refrigerated and heated to room temperature while being subjected to the stress and strains of rough handling. It is quite apparent that under such conditions, if a resinous adhesive is used to seal the side seam of the can, the bond must remain tough and secure throughout the temperature range.

Objects of the present invention, therefore, are: to provide exceptionally tough and secure bonds of high peel strength between uncoated or coated members, particularly the latter; to employ for such bonding certain polyester compositions which are desirable from the economic standpoint; to provide adhesive compositions and a process for their use which obviates any need for high pressures or other costly operations; to provide a bonding process whereby the utility of said polyester compositions for bonding is greatly enhanced; and to provide articles of manufacture having bonds of said polyester compositions.

These and other objects hereinafter appearing have been attained in accordance with the present invention through a rather complex discovery. Several unexpected aspects of this discovery are: that greatly superior bonds may be obtained even where the glass transition temperature ($T_g$) of the polyester composition is actually substantially below the temperature at which the bond is subjected to stress; that the crystallinity of the resin which forms the bond must be held below a certain degree; that a proper balance of $T_g$ and degree of crystallinity are important in obtaining good bond strength and toughness; and that the bond may be obtained by the process of sandwiching with or without substantial pressure, a melt of the resin between the members to be bonded and then cooling at such a rate that crystallization of the resin is greatly retarded.

Other aspects of the invention will hereinafter become apparent.

In a more specific sense, the polyester composition should have a $T_g$ below about 30° C. and preferably below about 20° C. The most desirable $T_g$ is below about 0° C. for uses such as in securing the side seam of beverage cans which may be subjected to considerable stress and strain at temperatures around 0° C. The crystallinity of the solidified resin should be less than about 25% which is attained by cooling it from its melt in a carefully regulated manner. It is preferred, particularly for beverage can use, that the crystallinity be held to between about 15% to about 25% since a certain amount of crystallinity imparts good strength (tensile properties) to the bond at higher temperatures such as encountered in various beverage processing steps such as pasteurization. Where the crystallinity exceeds about 25%, however, the adhesive layer is generally too brittle and low peel strengths result.

The polyesters of the present invention may be prepared by conventional techniques, preferably by ester interchange of glycols and dialkyl esters of dicarboxylic acids. More than one glycol or acid may be used to give copolymers where, for example, modification of a straight polyester is required to give the proper $T_g$. Applicants' several examples in Table I below readily illustrate this copolymerization modification. The glycol may be aliphatic or alicyclic, and contain from 2 to 20 carbon atoms, and may be straight or a branched chain. Examples of such glycols are ethylene glycol, 1,2-propylene glycol, 1,4-butanediol, 1,6-hexanediol, 1,10-decanediol, 1,3-pentanediol, 2,2-dimethyl-1, 3-propanediol, 1,4-cyclohexanedimethanol, diethylene glycol, and triethylene glycol. The dicarboxylic acid may be aliphatic, alicyclic, or aromatic and contain from 3 to 20 carbon atoms. The carbon chain of the aliphatic acids may be straight or branched. Examples of such acids are malonic, dimethylmalonic, adipic, 2-methyladipic, azelic, sebacic, terephthalic, isophthalic, hexahydroterephthalic, hexahydroisophthalic, trans-1,4-cyclohexanedicarboxylic, 2,5-norbornane-dicarboxylic, and oxdipropionic. The preferred one of all of the polyesters useful in the present invention is that prepared from trans-1,4-cyclohexanedicarboxylic acid and 1,4-butanediol having an I.V. of between about 0.6 and 1.8 or higher, with an I.V. of between about 0.8 and 1.4 being most preferred. In this regard, it has been found that for the useful polyesters in general, the I.V. should be above about 0.4.

Materials which may be laminated by the adhesives of the present invention include steel, iron, aluminum, copper, brass, bronze, nickel, zinc, titanium, tin, wood, paper, cellulose esters, glass, and ceramic materials Also any of these substances may first be coated with resins such as polyepoxide, melamine, phenolic, alkyd, vinyl, or acrylic. The vinyl coatings include homopolymers and copolymers of vinyl chloride and vinyl acetate and also polyvinyl alcohol and polyvinyl acetals.

Coatings of particular interest to the present invention are those of polyepoxide resins. A review of these resins is given by C. C. Schildkneckt in "Polymer Processes," Interscience Publishers, Inc., 1956, pp. 429–474. The epoxide derivatives may be prepared by the reaction between phenolic compounds and epichlorohydrin as described on pp. 429–432. They are also described in U.S. Pats. 2,643,239, 2,694,694, and 2,582,985. The epoxy equivalent (grams of resin containing 1 gm. equiv. of epoxide) may be 140–4,000.

Glycidylamine resins derived from epichlorohydrin and amines, such as 4,4'-methylene-dianiline, may be used. Also aliphatic and cycloaliphatic epoxides, such as butadiene epoxide, vinyl cyclohexene dioxide, and dicyclopentadiene dioxide, may be used. In general, the epoxides described by Schildkneckt on pp. 432–439 and those listed in U.S. Pat. 3,098,056, column 3, may be used. The polyepoxides may be cured (hardened) by heating with about 1 to 30 wt. percent of a curing agent (hardener), as described by Schildkneckt on pp. 439–454.

Coatings consisting of polyesters also are of value in the present invention. For instance, beverage and food cans may be coated with a polyester derived from terephthalic or hexahydroterephthalic acid. Strong bonds are obtained with the polyester melt adhesives of the present invention. The same or different materials may be laminated in one structure. It is generally advisable to clean the surfaces of the components to be laminated just prior to formation of the melt adhesive bonds to remove foreign matter, grease, oxide coatings, etc., which might interfere with the formation of strong bonds.

The invention is, of course, applicable to the bonding of unsupported films of polyesters, vinyls, etc.

The polyester adhesive may be applied in molten form with a spatula or regular extrusion equipment to the surfaces of the components to be laminated. If the polyester is soluble in a volatile solvent, such as chloroform, it may be applied as a dope and the solvent allowed to evaporate. Alternatively a film of the polyester may be placed between the surfaces. After application of the polyester, the surfaces are clamped together with a pressure of several pounds per square inch, and heat is applied by placing the clamped structure in a forced-air oven, hot oil bath, or in a metal bath at a temperature about 20 to 50° C. above the softening range of the polyester. A convenient way of bonding 8-mil metal test strips for peel tests is to heat them together on a hot plate while rubbing back and forth with a wooden spatula. No additional pressure is necessary. A glue line (adhesive thickness) of 3 to 5 mils is preferred, although from about 1–10 mils or more will work to a degree.

It was expected that the best adhesives for use above room temperature would be amorphous polymers with $T_g$'s above the use temperature. It was surprisingly found, however, that these polyesters had low peel strengths, particularly on the polyepoxide coated substrates. The adhesives with the highest peel strengths were those with $T_g$'s below about 30° C. High peel strengths above room temperature were obtained where the polyester adhesive also had a small amount of crystallinity. A high amount of crystallinity, however, greatly decreased the peel strength and made the polymers brittle. The best test adhesives were those with a $T_g$ below about 30° C. and a degree of crystallinity less than about 25% when the polymer was cooled from its melt to 25° C. at a rate of 200° C. per minute. Most of the polymers were cooled from 250° C. since they were melted at this temperature. This measurement was carried out with a differential scanning calorimeter, and the degree of crystallinity was calculated from the area of the melting peak when the crystallized sample was remelted. The degree of crystallinity may be varied by changing the copolymer compositions, as is illustrated in the examples. The inherent viscosity also has some effect on the degree of crystallinity. The polymers with low inherent viscosities tend to be more crystalline than those with higher inherent viscosities. At 70° C., when the $T_g$ is below 30° C., a degree of crystallinity of at least about 5% is required. Heat resistance at 70° C. is of interest in the can industry because this is the pasteurization temperature of beer. It is noted, variations in cooling rate, adhesive film thickness, and the like may readily be determined by way of the above guidelines in order to obtain the necessary resin crystallinity. In general, the crystallinity goes down as the cooling rate goes up. Cooling rates of between about 20° C./min. and about 500° C./min. have been found effective in obtaining the proper crystallinity with rates of between about 100° C./min. and about 300° C./min. being preferred for most applications.

Fillers, pigments, and glass cloth and the like may be incorporated in the adhesive layer to increase the bonding strength and temperature resistance. Fillers and pigments, such as very finely divided silica, alumina, or calcium carbonate, also affect the degree of crystallinity and the size of the crystallites. From about 1 to 30% by weight of filler or pigment may be added. Antioxidants and stabilizers also may be incorporated in the polymers to improve the thermal and oxidative stability at elevated temperatures.

The following examples will further illustrate the invention. In the examples, all polyesters were prepared by conventional procedures from glycols and dialkyl esters of dicarboxylic acids. Inherent viscosities (I.V.) were determined at a concentration of 0.25 g./100 ml. of 60/40 phenol/tetrachloroethane. Glass transition temperatures ($T_g$) were determined with a differential scanning calorimeter (Perkin Elmer Model DSC–1). This instrument was also used for determining the crystallinity of the polymers. The procedure consisted of heating the polymer above its melting point (250° C. in most cases), holding at this temperature for 2 min., cooling to 25° C. at a rate of 200° C./min., and then reheating at a rate of 20° C./min. to above melting point. The heat of fusion of the sample was measured with the differential scanning calorimeter, and the percent crystallinity was determined by comparison with the heat of fusion (J. Polymer Sci., 55, 643 (1961)) of a completely crystalline polyester from terephthalic acid and 1,4-butanediol. The T-peel strengths of laminates with aluminum and tin-free steel were measured in accordance with ASTM D1876–61T but using precut 8-mil can stock specimens. The specimens, 1 in. wide, were degreased by washing three times with a detergent solution of Alconox (Alconox, Inc.) and rinsing in water each time. The specimens were then rinsed with acetone and allowed to dry in the air. A specimen was heated sufficiently on a hot plate for the polyester to melt (applied as 20-mesh particles or by rubbing a large piece back and forth). After the molten polymer was evenly spread on the specimen over a 2 in. length with a wooden spatula, the top piece of metal was pressed against the sample. The sample was then turned over on the hot plate with the second metal strip against the hot plate surface. Heating was continued while the wooden spatula was rubbed back and forth over the adhesive area until a smooth, even glue line was obtained (about 30 sec.). Then the specimen was placed on the laboratory bench and rubbing continued for about 20 sec. longer while the adhesive cooled. This method of forming the adhesive bonds gave reproducible results similar to those obtained by clamping the specimens together and heating in a forced-air oven 20 to 50° C. above the polymer melting point. Glue lines were about 3 to 5 mils in thickness. It is particularly noted that pressure is not required to make the bond, but it may be used if desired.

The tensile shear strengths of the laminates were measured by modification of ASTM D1002–64. The modification consisted of the use of precut aluminum and steel can stock specimens 8 mils (instead of 64 mils) in thickness and a ¼ in. overlap (instead of ½ in.). These specimens, 1 in. in width, were cleaned as described above, and the adhesive bonds were formed in the same manner but with a ¼ in. overlap. The tensile shear strengths and T-peel strengths were determined on an Instron tensile tester. A forced-air oven was fitted around the tester for the determinations at 70° C.

Some of the 8-mil aluminum and steel specimens were coated with polyepoxide by dipping into a solution consisting of 10 g. of the epoxy resin, 0.3 g. of diethylenetriamine, and 70 ml. of chloroform. The coating was dried in air and then cured for 1 hr. in an oven at 200° C.

Table 1 lists the T-peel and tensile shear strengths which were obtained with laminates of polyepoxide coated and uncoated specimens with various polyester hot melt adhesives. Also listed are the $T_g$'s and the degree of crystallinity, determined as previously described. In most samples a higher degree of crystallinity is obtained when the molten polymer is cooled at a slower rate than 200° C./min., but this rate was used since it approximated the cooling rate when the actual bonds were made for testing (Table 1).

Acid derivatives used in preparing the polyesters are abbreviated as follows:

Adipic—A
Azelaic—Az and polyexopide-coated steel is also obtained when each of the following pigments are incorporated in each of the polyesters of Examples 9, 16, 20, and 26.

Weight percent
Multifex MM (finely divided calcium carbonate from Diamond Alkali Co.) _____ 5
Multifex MM _____ 20
Cab-O-Sil (finely divided silica from Cabot Corp.) ___ 5
Finely divided alumina _____ 10

TABLE 1

| | Polyester | | | | Crystal- linity, percent | T-peel strength, lb./in. | | | | Tensile shear strength, $10^3$ p.s.i. | | | |
|---|---|---|---|---|---|---|---|---|---|---|---|---|---|
| | | | | | | Al | | Coated Al | | Steel | | Coated Steel | |
| | Acid derivative | Glycol | I.V. | $T_g$, °C. | | 23° | 70° | 23° | 70° | 23° | 70° | 23° | 70° |
| Example: | | | | | | | | | | | | | |
| 1 | T | EG | 0.84 | ¹69 | | 1 | | 1 | | 0.7 | | | |
| 2 | T | CHDM | 0.86 | ¹85 | | 1 | | 1 | | 0.8 | | | |
| 3 | C | CHDM | 0.92 | ¹52 | | 1 | | 1 | | | | | |
| 4 | T | B4 | 0.85 | 20 | ¹30 | 1 | | 1 | | | | | |
| 5 | C | EG | 0.84 | 18 | 0 | 16 | 1 | 23 | 1 | 1.6 | | | |
| 6 | C | P3 | 0.86 | −6 | 0 | | | 13 | 1 | | | | |
| 7 | C | B4 | 0.51 | −12 | ¹28 | 1 | | 2 | | | | | |
| 8 | C | B4 | 0.86 | −12 | 22 | | | 30 | 32 | | | (²) | (²) |
| 9 | C | B4 | 1.17 | −12 | 17 | 5 | | 33 | 46 | 1.5 | | (²) | (²) |
| 10 | C | B4 | 1.43 | −12 | 17 | 6 | | 40 | | | | (²) | (²) |
| 11 | C | 80/20, B4/EG | 0.96 | 0 | 10 | 20 | | 60 | 22 | | | (²) | (²) |
| 12 | C | 67/33, B4/NPG | 0.92 | 2 | 12 | | | 36 | 26 | 1.7 | | (²) | (²) |
| 13 | 60/40, C/T | B4 | 0.53 | 2 | ¹28 | 1 | | 2 | | | | | |
| 14 | 60/40, C/T | B4 | 0.86 | 2 | 17 | 8 | | 26 | 35 | 1.8 | | (²) | (²) |
| 15 | 75/25, T/A | EG | 0.87 | ¹34 | 0 | 1 | | 4 | | | | | |
| 16 | 67/33, T/A | EG | 0.92 | 15 | 0 | 38 | | 45 | 5 | 1.8 | 0.6 | (²) | |
| 17 | 85/15, T/Az | EG | 0.87 | ¹44 | 0 | 1 | | 4 | | | | | |
| 18 | 80/20, T/Az | EG | 0.98 | 28 | 0 | | | 10 | 13 | 1.9 | 0.9 | (²) | |
| 19 | 70/30, T/HT | B4 | 1.06 | 16 | 16 | | | 7 | 18 | (²) | | (²) | (²) |
| 20 | 60/40, T/HT | B4 | 0.95 | 7 | (³) | 6 | 3 | 41 | 19 | (²) | | (²) | (²) |
| 21 | 50/50, T/HT | B4 | 1.05 | 4 | (⁴) | 15 | | 79 | 29 | (²) | | (²) | |
| 22 | 40/60, T/HT | B4 | 0.90 | 4 | <5 | | | 78 | 27 | 1.6 | | (²) | 0.5 |
| 23 | HT | B4 | 1.14 | −11 | 0 | 8 | | 30 | | 1.5 | | (²) | |
| 24 | 70/30, T/HT | 80/20, B4/EG | 0.87 | 20 | <5 | | | 51 | 7 | (²) | | (²) | |
| 25 | 50/50, T/S | B4 | 1.23 | <0 | <5 | 17 | | 20 | 9 | 1.5 | 0.7 | (²) | |
| 26 | 50/50, T/S | CHDM | 0.86 | 20 | 18 | 21 | 10 | 32 | 12 | | | | |
| 27 | 70/30, I/HI | D10 | 0.91 | <0 | 0 | 13 | | 17 | | | | (²) | |

¹ Because of high value, composition is not included in invention.
² Tensile shear strength is greater than 2,000 p.s.i. because the steel broke instead of the adhesive bond.
³ Crystallized at 43–76° C. (Peak at 54° C.) when cooled sample was reheated to M.P. (12% crystallinity).
⁴ Crystallized at 57–89° C. (Peak at 73° C.) when cooled sample was reheated to M.P. (9% crystallinity).

Trans-1,4-cyclohexanedicarboxylic—C
Hexahydroisophthalic (about 50% trans isomer)—HI
Hexahydroterephthalic (about 50% trans isomer)—HT
Isophthalic—I
Sebacic—S
Terephthalic—T Glycols used in preparing the polyesters are abbreviated as follows:

Ethylene glycol—EG
1,3-propanediol—P3
1,4-butanediol—B4
1,10-decandiol—D10
2,2-dimethyl-1,3-propanediol (neopentyl glycol)—NPG
1,4-cyclohexanedimethanol—CHDM All percentages in the table refer to mole percent and temperatures are centigrade.

Aluminum and steel are illustrated in the following examples, but high bond strengths are also obtained on stainless steel, iron, copper, brass, bronze, nickel, zinc, titanium, tin, wood, paper, cellulose esters, glass, and porcelain.

Similar peel strengths are obtained when 8-mil tin-free steel (instead of 8-mil aluminum) is first coated with epoxy resin. The polyepoxide coating in these examples was prepared with an epoxy resin (epoxy equivalent 900) derived from Bisphenol A and epichlorohydrin and cured, but good adhesion is also obtained with Epons 562, 828, 834, 1001, and 1004 (Shell Chemical Co.) after the coatings are cured. Good adhesion can also be obtained when the coating consists of a vinyl, e.g., 87/13 polyvinyl chloride/polyvinyl acetate copolymer, or cured thermosetting resins such as melamine, phenol formaldehyde, epoxy phenolic resin or alkyd resins. Good adhesion on steel In the above table, Examples 1, 2, 3, 15, and 17 illustrate polyesters with $T_g$'s above 30 C. In all cases the adhesion is low, particularly the T-peel strengths.

Examples 4, 7, and 13 illustrate polyesters with over 25% crystallinity, and the adhesion in each case is poor.

Examples 7–10 show the effect of the inherent viscosity on percent crystallinity and adhesion of one polymer. The crystallinity decreased as the I.V. increased to 1.17, and then the crystallinity remained constant when the I.V. was increased to 1.43. This polymer is of particular interest because its $T_g$ is low enough for it to have good adhesive properties at 0° C., and it has sufficient crystallinity to give it good properties at 120° C., which is the sterilization temperature of many foods. On the polyepoxide coated tin-free steel, the T-peel strength of the polymer (I.V. 1.17) was 25 lb./in. at 0° C. and 15 lb./in. at 120° C., and its tensile strength was 1500 p.s.i. at 120° C.

Two other examples which show the effect of I.V. on the degree of crystallinity and adhesion are Examples 13–14.

Examples 15–16 show the remarkable improvement in adhesion which is attained when the $T_g$ of a copolymer is reduced by increasing the adipic acid content. This is also shown in Examples 17–18 wherein the azelaic acid content is increased.

A series of other particularly desirable adhesion polymers employ an acid component consisting essentially of from about 30 to about 70 mole percent of terephthalic acid and 70 to 30 mole percent of hexahydroterephthalic acid, said latter acid containing at least about 40% of the trans isomer, and 1,4-butanediol, said adhesive composition having an I.V. of above about 0.6. Examples 19–22 illustrate this series. The two homopolymers of these acids are Examples 4 and 23. By modification of the homopolymer of Example 4, the $T_g$ and degree of crystallinity are decreased; and the adhesion is greatly increased, particularly the T-peel strength. Adhesive bonds containing no crystallinity were obtained in Examples 20 and 21, but crystallization occurred when the samples were heated. It is preferred that crystallization occur only when the bond is cooled after being formed because later crystallization weakens the adhesive bond.

In several examples the T-peel strengths are higher at 70° C. than at 23° C. This apparently is because some of the crystallites had melted at 70° C. Crystallites are necessary for heat resistance, but they also reduce the peel strength. It is particularly pointed out that the preferred adhesive compositions of the present invention have T-peel strengths of at least 10 lb./in. width at 23° C. This property represents an exceptional peel strength for polyester adhesives, but, even so, some of applicants' adhesives gave remarkable peel strength in excess of 50 lbs./in. width at 23° C.

The invention has been described in detail with particular reference to preferred embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. An article of manufacture comprising at least two polyepoxide coated substrates bonded together by an adhesive composition having a $T_g$ below about 30° C., an inherent viscosity of above about 0.6 when determined in a solution of 0.25 gram of adhesive composition in 100 ml. of 60/40 phenol/tetrachloroethane and a crystallinity less than about 25 percent, said adhesive composition comprising a polyester of at least one glycol having from 2–10 carbon atoms and at least one dicarboxylic acid selected from the group consisting of terephthalic acid, isophthalic acid, hexahydroterephthalic acid and hexahydroisophthalic acid, and aliphatic dicarboxylic acids of 3–20 carbon atoms.

2. The article of claim 1 wherein said substrate is selected from the group consisting of metals, wood, paper, cellulose esters and glass.

3. The article of claim 1 wherein said glycol is 1,4-butanediol and said dicarboxylic acid is the trans-1,4-cyclohexanedicarboxylic acid isomer of hexahydroterephthalic acid.

4. The article of claim 1 wherein the glycol is 1,4-butanediol.

5. A process of bonding together at least two polyepoxide coated substrates comprising applying between the substrates an adhesive composition having a $T_g$ below about 30° C., an inherent viscosity of above about 0.6 when determined in a solution of 0.25 gram of adhesive composition in 100 ml. of 60/40 phenol/tetrachloroethane and a crystallinity less than about 25 percent, said adhesive composition comprising a polyester of at least one glycol having from 2–10 carbon atoms and at least one dicarboxylic acid selected from the group consisting of terephthalic acid, isophthalic acid, hexahydroterephthalic acid and hexahydroisophthalic acid, and aliphatic dicarboxylic acids of 3–20 carbon atoms.

6. The article of claim 5 wherein said substrate is selected from the group consisting of metals, wood, paper, cellulose esters and glass.

7. The process of claim 5 wherein said glycol is 1,4-butanediol and said dicarboxylic acid is the trans-1,4-cyclohexanedicarboxylic acid isomer of hexahydroterephthalic acid.

8. The process of claim 5 wherein the glycol is 1,4-butanediol.

References Cited

UNITED STATES PATENTS

| | | | |
|---|---|---|---|
| 3,372,148 | 3/1968 | Wiener | 161—194 X |
| 3,374,137 | 3/1968 | Wiener | 161—232 X |
| 3,461,025 | 8/1969 | Coleman et al. | 161—195 X |
| 3,464,878 | 9/1969 | Schwarz | 156—330 |
| 2,443,736 | 6/1948 | Kropa | 260—872 |
| 2,676,128 | 4/1954 | Piccard | 117—126 |
| 2,683,100 | 7/1954 | Edgar et al. | 117—232 |
| 2,765,250 | 10/1956 | Williams | 161—194 |
| 2,785,085 | 3/1957 | Sayre | 161—184 X |
| 2,892,747 | 6/1959 | Dye | 161—214 |
| 2,952,879 | 9/1960 | Kitson et al. | 264—290 |
| 2,965,613 | 12/1960 | Milone et al. | 260—75 |
| 3,036,948 | 5/1962 | Danielson | 161—184 |
| 3,160,605 | 12/1964 | Kantor et al. | 161—194 X |
| 3,170,833 | 2/1965 | Noyes | 161—233 X |

HAROLD ANSHER, Primary Examiner

U.S. Cl. X.R.

156—330, 332; 161—185, 186, 231